Jan. 5, 1954
J. J. McCRINK
2,664,750
PRESSURE GAUGE
Filed Dec. 26, 1950
2 Sheets-Sheet 1
Fig. 1.
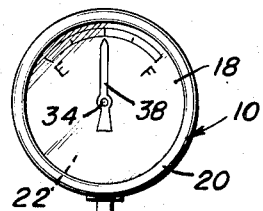
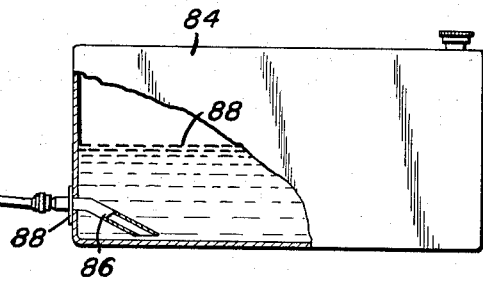
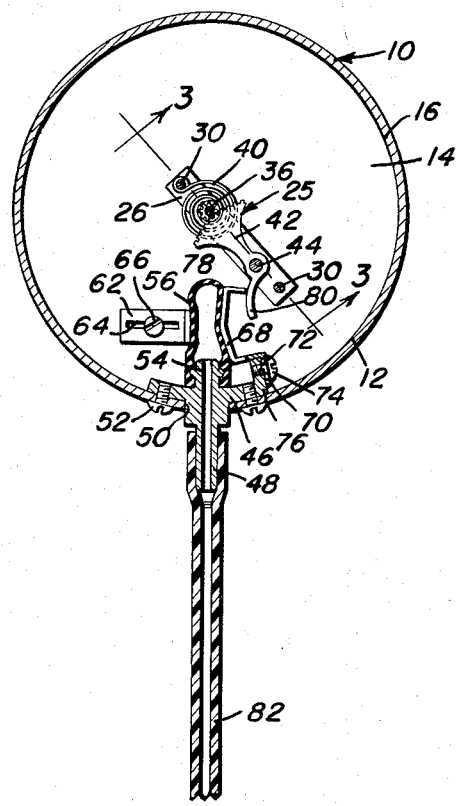
Fig. 2.
Fig. 4.
Fig. 5.
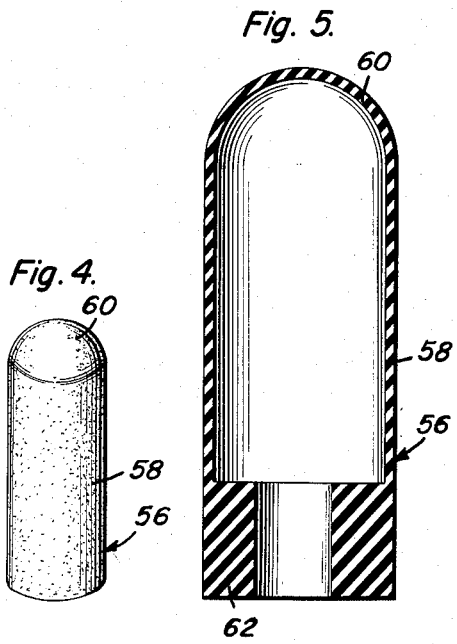
Joseph J. McCrink
INVENTOR.
BY *Clarence A. O'Brien*
*and Harvey B. Jacobson*
Attorneys Jan. 5, 1954  J. J. McCRINK  2,664,750
PRESSURE GAUGE
Filed Dec. 26, 1950  2 Sheets-Sheet 2
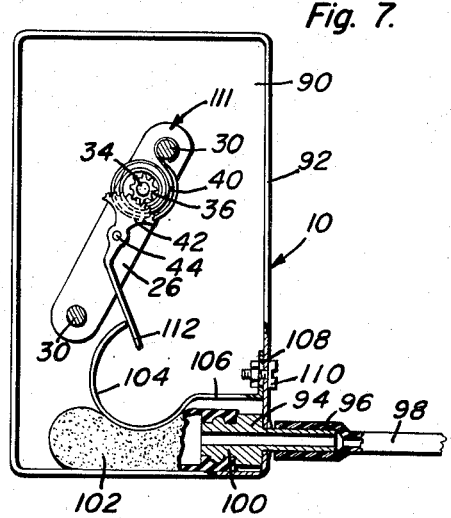
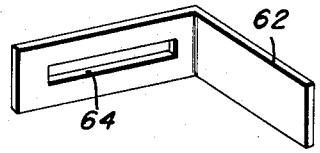
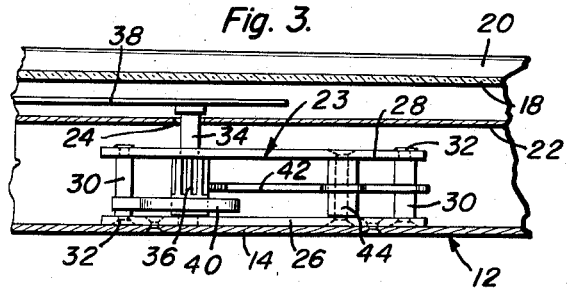
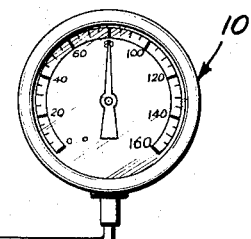
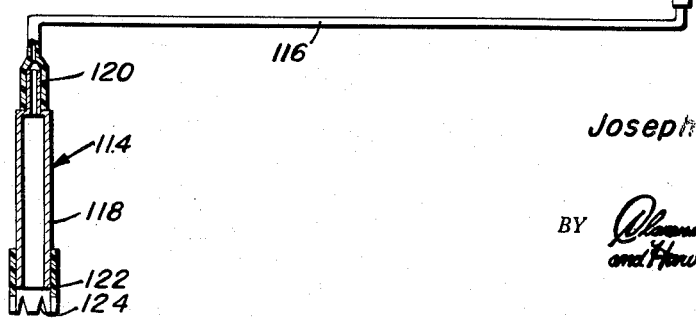
Joseph J. McCrink
INVENTOR.
BY
Attorneys Patented Jan. 5, 1954

2,664,750

UNITED STATES PATENT OFFICE 2,664,750

PRESSURE GAUGE

Joseph J. McCrink, West Orange, N. J.

Application December 26, 1950, Serial No. 202,686

6 Claims. (Cl. 73—409)

This invention comprises novel and useful improvements in pressure gauges, and more particularly pertains to gauges for measurement of the liquid level in a remotely positioned tank.

An important object of this invention is to provide a gauge which is of compact and simple construction, and which is responsive to minor variations in pressure whereby the gauge is adapted to accurately measure the level of the fluid in a remotely positioned tank.

Another important object of this invention is to provide a gauge in which the amplitude of the needle movement in response to a given variation in pressure may be readily adjusted so as to accommodate the gauge to different pressure ranges.

Still a further object of this invention is to provide a gauge, in accordance with the foregoing objects, in which the magnitude of the minimum pressure the gauge is adapted to indicate may be readily varied, within limits.

An important feature of this invention resides in the provision of a diametrically expansible bulb, with a bracket engaging one side of the bulb, a pivotally mounted needle actuating sector plate having an arm extending therefrom, with a resilient finger engaging the bulb and arm on the sector plate to pivot the latter as the bulb expands and contracts.

Another important feature of this invention resides in the provision of a gauge, in accordance with the foregoing feature in which the finger is adjustably movable towards and away from the pivot point of the sector plate to adjust the range of pressure differentials over which the gauge is adapted to operate.

Yet another feature of this invention resides in the provision of a gauge, in accordance with the foregoing features, in which the bulb engaging bracket is movable relative to the bulb to adjust, within limits, the magnitude of the minimum pressure which the gauge is adapted to measure.

These, together with various ancillary objects and features are attained by this device, a preferred embodiment of which has been illustrated in the accompanying drawings wherein:

Figure 1 is a front elevational view of the pressure gauge shown connected to a tank, parts of the tank being broken away to show the manner in which the gauge is connected to the tank;

Figure 2 is a vertical sectional view through the pressure gauge;

Figure 3 is a fragmentary sectional view taken on the plane 3—3 of Figure 2;

Figure 4 is a side elevational view of the diametrically expansible bulb;

Figure 5 is a longitudinal sectional view through the bulb;

Figure 6 is a perspective elevational view of the adjustable bracket for constraining expansion of the bulb in one direction;

Figure 7 is a vertical sectional view of a modified form of pressure gauge; and, Figure 8 is a front elevational view of a gauge having a modified form of attachment thereon for connecting the gauge to a tank.

Reference is now made more specifically to the accompanying drawings wherein the pressure gauge is denoted generally by the numeral 10.

The gauge shown in the embodiment of Figures 1-6 includes a casing 12 having a back wall 14 and a peripheral side wall 16. A transparent closure 18 is disposed over the open end of the casing, and is retained thereon by a flanged rim 20. A face plate 22 is disposed in the casing, in spaced relation to the closure 18, and is provided with a central aperture 24 for reasons which will later become apparent as the following description proceeds.

An indicator mechanism 25 includes a pair of mounting plates 26 and 28 which are spaced apart as by bars 30, having reduced ends 32 which extend through the plates and are riveted or otherwise flared into locking engagement with the plates. A shaft 34 is rotatably journaled in the plates 26 and 28, and a pinion 36 is non-rotatably secured to the shaft between the plates. As will be noted, the ends of the pinion engage the plates to limit axial movement of the shaft 34, and the shaft extends through the aperture 24 in the face plate 22 and has an indicator needle 38 on the end thereof. A helical spring 40 is disposed about the pinion 36 and is terminally secured to the pinion and one of the spacing sleeves 30 to yieldingly bias the needle in a counterclockwise direction, as viewed in Figure 1. A toothed sector 42 is attached to a trunnion 44 which is rotatably mounted between the plates 26 and 28, the sector being in meshing engagement with the pinion.

A flanged hose coupling 46 has a sleeve 48 thereon which extends through an opening 50 in the side wall 16, the coupling being secured to the side wall by fasteners 52. An externally convoluted ring 54 is carried by the hose coupling, and communicates with the sleeve 48 thereon, and a diametrically expansible bulb 56 is carried by the ring. As will be appreciated from a consideration of Figures 4 and 5, the bulb 56 of rubber or the like includes a substantially cylindrical side wall 58, a hemispherical end wall 60 and a thickened reinforced open end 62 for the reception of the sleeve 48.

An L-shaped bracket 62 has a slot 64 in one leg thereof for the reception of a fastener 66, whereby the bracket is adjustably mounted on the back wall 14 for movement towards and away from the bulb 56. A U-shaped resilient finger 68 has an integral ear 70 on the end of one leg thereof, which ear has a slot 72 therein for adjustably receiving the fastener 74 by means of which the finger is secured to the lip 76 on the casing. As is best shown in Figure 2, the web of the U-shaped member 68 engages the bulb 56, and the leg 78 of U-shaped member, remote from the leg from which the ear 70 extends, slidably engages the arm 80 carried by the sector 42, whereby the sector is rotated in response to diametrical expansion and contraction of the bulb. It may be noted, at this time, that the finger is adjustable towards and away from the pivotal axis of the sector, by means of the slot 72, whereby the range of the pressures which will be necessary to produce full scale deflection of the needle 38, may be readily varied. Additionally, the bracket 62 is adjustable towards and away from the bulb to adjust, within limits, the magnitude of the minimum pressure which the gauge will respond to.

The gauge 10 is connected by a flexible conduit 82 which is secured at one end to the sleeve 48, to a tank 84. The tank has an angulated tube 86 extending through an opening in one side wall thereof, which tube is fixed to the tank by means of the flange 88 so that the inner end of the tube extends downwardly and terminates in spaced relation to the tank bottom. As is apparent, the conduit 82 is secured to the tube 86. It is contemplated that the gauge be actuated by the variation in pressure in the tube, caused by the varying liquid level 88 in the tank, and accordingly the tube 86 should be so dimensioned as to minimize the capillary action of the liquid as it enters the tube.

In the embodiment shown in Figure 7, the casing is formed similar to that shown in the embodiment of Figures 1–6, but differs therefrom in that it has a rectangular back 90 and a peripheral side wall 92. The hose coupling 94, as in the previous embodiment, has a sleeve 96 thereon for the reception of a conduit 98, and an externally convoluted ring 100 for the reception of the bulb 102, formed similar to that of the previous embodiment. The bulb 102, however, has one side thereof disposed against one side of the casing, and an arcuate resilient finger 104 engages the diametrically opposed side of the bulb. The finger has an integral L-shaped bracket 106 thereon, one leg of which bracket has a slot 108 for slidably receiving a fastener 110, whereby the finger 104 is adjustably movable towards and away from the bulb, to vary the magnitude of the minimum pressure which will cause the indicator needle of the second embodiment to move.

Since the indicator mechanism 111 in the second embodiment is substantially the same as the indicator mechanism 25 of the first embodiment, separate description thereof is believed to be unnecessary. However, it may be noted that the sector 42 of the second embodiment has an arm 112 extending therefrom, and which is engaged by the end of the finger 104 whereby the sector 42 is pivoted about the axis of its trunnion 44, as the bulb 102 expands and contracts.

In the embodiment shown in Figure 8, there is disclosed an attachment 114 for connecting the conduit 116 from the gauge 10, to a tank (not shown). This attachment includes an elongated sleeve 118 having a diametrically reduced end 120 for the reception of the tube. A bushing 122 having a serrated lower edge 124 is disposed on the end of the sleeve remote from the reduced end 120, to space the sleeve from the tank bottom. It is contemplated that the attachment depend vertically in the casing and that the bushing space the attachment from the bottom wall of the tank. Thus, the liquid in the tank will exert pressure on the air in the sleeve 118 and conduit 116, to actuate the gauge. Obviously, the attachment 114 may be utilized with the gauges shown in both the embodiments of Figures 1–6 and the embodiment of Figure 7.

From the foregoing, it will be appreciated that fluctuations of the liquid level in the tank will vary the pressure on the air in the diametrically expansible bulbs which will cause the fingers in engagement therewith to pivot the sector and consequently rotate the indicator needle. Further, it will be noted that the spring 40 returns the needle to its initial position and retains the arm on the sector in yielding contact with the actuator finger.

In the embodiment of Figures 1–6, adjustment of the finger 68 towards and away from the pivotal axis of the sector will obviously vary the pressure differential necessary to cause full scale deflection of the needle. Further, adjustment of the bracket 62 towards and away from the bulb will vary the minimum pressure in the bulb which will produce a deflection of the needle, since the bracket serves to constrain expansion of the bulb in one direction.

Having described the invention, what is claimed as new is:

1. A pressure gauge comprising a casing, a diametrically expansible bulb disposed in said casing, means engaging one side of said bulb for constraining expansion of said bulb in one direction, a resilient finger attached to the casing and engaging the diametrically opposed side of said bulb, an indicator needle rotatably mounted in said casing for movement about an axis transverse the plane of movement of said finger, a pinion attached to said needle, a toothed sector rotatably mounted on said casing for rotation about an axis parallel to the axis of rotation of said needle, an arm extending from said sector plate, said finger slidably engaging said arm to pivot said sector in response to expansion of said bulb, said bulb constraining means being adjustably movable toward and away from said bulb.

2. A pressure gauge comprising a casing, a diametrically expansible bulb disposed in said casing, means engaging one side of said bulb for constraining expansion of said bulb in one direction, a resilient finger attached to the casing and engaging the diametrically opposed side of said bulb, an indicator needle rotatably mounted in said casing for movement about an axis transverse the plane of movement of said finger, a pinion attached to said needle, a toothed sector rotatably mounted on said casing for rotation about an axis parallel to the axis of rotation of said needle, an arm extending from said sector plate, said resilient finger slidably engaging said arm, said finger being adjustable towards and away from pivot point of said sector to vary the amplitude of needle movement for a given variation of pressure in said bulb.

3. The combination of claim 2 including a spring biasing said arm into yielding contact with said finger.

4. The combination of claim 2 wherein said means engaging said one side of said bulb comprises a wall of said casing.

5. The combination of claim 2 wherein said means engaging said one side of said bulb comprises a slotted bracket, a fastener extending through the slot of said bracket and adjustably mounting the bracket to a wall of the casing for movement toward and away from said bulb.

6. A pressure gauge comprising a casing, a diametrically expansible bulb disposed in said casing, means engaging one side of said bulb for constraining expansion of said bulb in one direction, a resilient finger attached to the casing and engaging the diametrically opposed side of said bulb for movement in response to pressure changes in the bulb, an indicator needle rotatably mounted in said casing for movement about an axis transversely of the plane of movement of said finger, means operatively connecting said finger and said indicator needle for moving the needle in response to movement of the finger, said means including a pivoted arm having its length extending across the path of said finger, and adapted to be contacted by a portion of said finger, said finger being adjustable to different positions along the side of said bulb, whereby the leverage with respect to said pivot of the contacting portion of said finger on said arm may be varied to vary the amplitude of needle movement for a given variation of pressure in said bulb.

JOSEPH J. McCRINK.

References Cited in the file of this patent

UNITED STATES PATENTS

| Number | Name | Date |
|---|---|---|
| 4,702 | Moreau | Aug. 20, 1846 |
| 1,823,491 | Heghinian | Sept. 15, 1931 |
| 1,868,328 | Kubiak | July 19, 1932 |
| 2,252,874 | Vischer, Jr. | Aug. 19, 1941 |